Oct. 9, 1962 SUA FOR SUN 3,058,069

MULTIVIBRATOR WITH D.C. VOLTAGE FREQUENCY CONTROL

Filed July 30, 1959

INVENTOR.
SUA FOR SUN

BY

Morgan, Finnegan, Durham & Pine
ATTORNEYS

United States Patent Office
3,058,069
Patented Oct. 9, 1962

3,058,069

MULTIVIBRATOR WITH D.C. VOLTAGE FREQUENCY CONTROL

Sua For Sun, Zurich, Switzerland, assignor to Landis & Gyr, A.G., Zug, Switzerland, a body corporate of Switzerland Filed July 30, 1959, Ser. No. 830,658
Claims priority, application Switzerland Aug. 20, 1958
4 Claims. (Cl. 331—113)

This invention relates to that class of electrical pulse circuits known as multivibrators and more particularly to multivibrators which are controlled by a variable D.C. potential.

Multivibrators are used to generate signals with special voltage curves, for example sawtooth, trapezoidal or rectangular. Such multivibrators have two amplifier components for example electron tubes, transistors, and the like, the output of each amplifier component being coupled by way of an RC combination back to the input of the other amplifier component. The frequency of oscillation of these multivibrators is determined by the time constant of the RC coupling, but the frequency may also be varied by means of a D.C. potential applied at a particular point in the multivibrator circuit. Multivibrators of this latter type have the disadvantage that the frequency of oscillation does not vary linearly with the applied D.C. potential.

This aberration is particularly troublesome when such D.C.-controlled multivibrators are used, for example, in a remote indication system in which data represented by a D.C. potential are to be converted into proportional pulse repetition rates.

There is a known multivibrator in which there is, within a certain interval, a linear relationship between a D.C. potential and the frequency of oscillation produced thereby. This multivibrator, however, requires at least one magnetic core of high-permeability sheet-metal and a plurality of windings, so that its manufacture is comparatively costly.

In contrast, the invention of this application provides a multivibrator with D.C. voltage control wherein the above-mentioned disadvantages are avoided by providing, in series in the input circuit of the multivibrator, a network comprising the parallel combination of resistance and capacitance.

It is accordingly an object of the invention to provide a D.C. voltage-controlled multivibrator which has a linear relationship between the variable D.C. voltage input and the pulse repitition rate output; in other words, a multivibrator of this type with a linear transfer function.

It is a further object to provide such a controlled multivibrator in which a wide range of linearity is achieved, not with complicated compensating circuits, but rather with a simple passive network of elementary electrical components.

These and other objects of the invention will be set forth in part hereinafter and in part will be obvious herefrom, or may be learned by practice with the invention, the same being realized and attained by means of the instrumentalities and combinations pointed out in the appended claims.

The invention consists of the novel parts, constructions, arrangements, combinations and improvements herein shown and described.

The drawing shows an exemplary embodiment of the invention of which:

Figure 1:
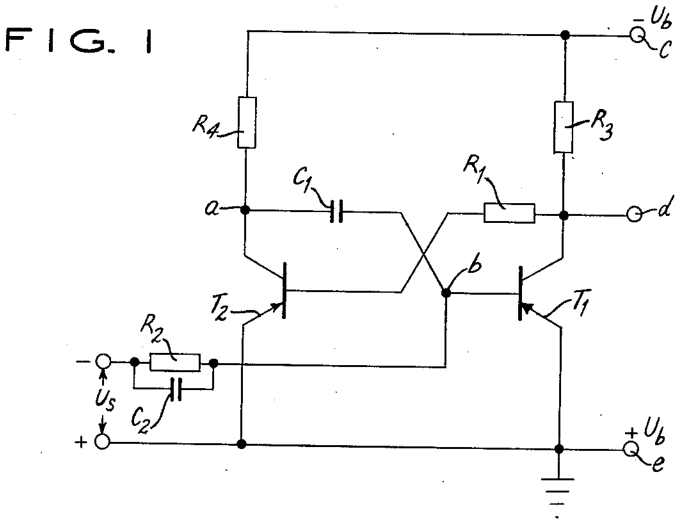
FIG. 1 shows the circuit of a multivibrator with D.C. voltage control.

FIG. 1 represents a multivibrator with two transistors $T_1$ and $T_2$, the collector of transistor $T_1$ being coupled via a resistance $R_1$ to the base of transistor $T_2$, and the collector of transistor $T_2$, (junction *a*) being connected via a coupling condenser $C_1$ to the base of transistor $T_1$. The emitters of the two transistors are grounded, while the base of transistor $T_1$ (junction *b*) is controlled, via a parallel circuit $R_2$, $C_2$, by a variable D.C. potential $U_s$. This, then, is a multivibrator with transistors in common-emitter connection. The circuitry is completed by resistances $R_3$ and $R_4$ in the collector circuits of transistors $T_1$ and $T_2$ respectively. A source of potential $U_b$ is connected between grounded terminal *e* and a terminal *c*, the latter being connected to resistances $R_3$ and $R_4$. Terminal *c* is negative relative to terminal *e*. The output of the multivibrator is taken from terminal *d* at the junction of $R_1$ and the collector of $T_1$.

Upon suitable choice of resistances $R_1$ to $R_4$, there is a negative impedance between junctions *a* and *b*, which, owing to interposition of the coupling condenser $C_1$, produces oscillations appearing in the form of rectangular pulses of like polarity between the output terminals *c* and *d*, or *d* and *e*. The frequency of the pulse sequence is approximately inversely proportional to the capacitance of the coupling condenser $C_1$.

Figure 2:
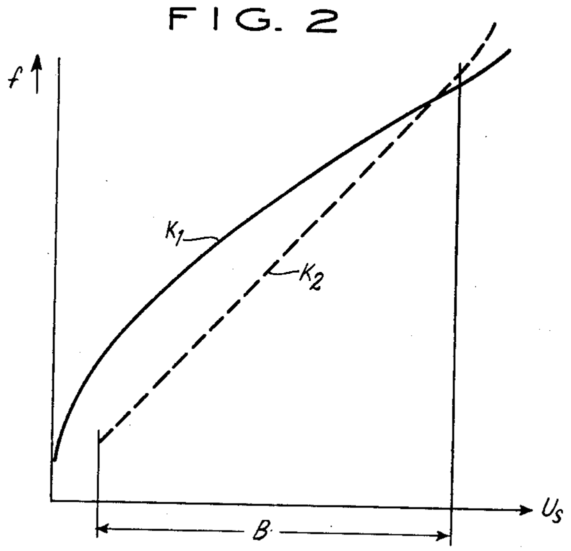
FIG. 2 shows a diagram of the repetition rate of the FIG. 1 multivibrator plotted as a function of the applied D.C. control voltage and a diagram illustrating the relationship between these variables when compensation is not provided.

In known multivibrators, the frequency of oscillation as a function of the applied D.C. control voltage shows a non-linear behavior which has been represented in FIG. 2 by the solid curve $K_1$. Now it has been found that by connecting a condenser $C_2$ or a capacitive network of suitable capacitance in parallel with the resistance $R_2$, the frequency vs. D.C.-control-voltage characteristic is linearized within the voltage interval B, as indicated by the dotted curve $K_2$ in FIG. 2. This linearization is doubtless due to the fact that the time constant of the discharge circuit of coupling condenser $C_1$ increases slightly with condenser $C_2$ connected, and this in such non-linear relation to the D.C. control voltage $U_s$, as to compensate for the non-linearity originally present.

The operating range of the multivibrator with regard to D.C. control voltage and frequency is adjustable within comparatively wide limits by suitable choice of coupling resistance $R_1$, resistance $R_2$, and coupling condenser $C_1$. If the coupling resistance $R_1$ is increased, the frequency of oscillation of the multivibrator, for constant D.C. control voltage $U_s$, becomes higher. An increase in the value of resistance $R_2$ on the other hand, results in a decrease in frequency of oscillation.

As amplifier components, use may be made of transistors, controlled electron tubes, etc. In the use of transistors, a temperature compensation arrangement must be added. This purpose may be served, for example, by replacing coupling resistance $R_1$ and/or resistance $R_2$ by a circuit with temperature-sensitive components.

Such compensating circuits are known, and therefore require no further elucidation here.

As an example of the use of the invention, remote metering of electric power may be mentioned. The electric power consumed at a station is converted into a D.C. potential by means of which the described multivibrator is controlled. The pulses generated at the output of the multivibrator are supplied, for example, via the electrical distribution network, to a pulse counter located at the point of indication. Since the pulse frequency bears a linear relation to the D.C. control potential of the multivibrator and hence also to the electric power to be measured, the number of transmitted pulses observed per unit time is a measure of the electric power. Another practical example occurs in a remote indication system for the liquid level in a tank. Here the level is converted into a D.C. potential by means of a float supported by the liquid and acting on a potentiometer control, and the potential in turn controls the multivibrator. At the point of indication, the pulse frequency is measured, being a measure of the liquid level.

The invention in its broader aspects is not limited to the specific mechanisms shown and described but departures may be made therefrom within the scope of the accompanying claims without departing from the principles of the invention and without sacrificing its chief advantages.

What is claimed is:

1. A D.C. voltage controlled multivibrator having a linear relationship between input control voltage and output frequency comprising first and second amplifiers, resistance means coupling the output of said first amplifier to the input of said second amplifier, capacitance means coupling the output of said second amplifier to the input of said first amplifier, and a passive linearizing control circuit connected to one of said amplifier inputs and adapted to be energized by a variable amplitude D.C. voltage comprising a resistance-capacitance combination connected in series with said one input.

2. Apparatus according to claim 1 in which said control circuit is connected to the input of said first amplifier.

3. Apparatus according to claim 1 in which said first and second amplifiers comprise transistors having base inputs and collector outputs.

4. Apparatus according to claim 1, in which said amplifiers comprise transistors and in which said resistance-capacitance combination includes a resistor and capacitor connected in parallel.

References Cited in the file of this patent

UNITED STATES PATENTS

| | | |
|---|---|---|
| 2,331,317 | Germeshausen | Oct. 12, 1943 |
| 2,598,516 | Dickinson | May 27, 1952 |